(12) United States Patent
Aslin et al.

(10) Patent No.: US 11,131,034 B2
(45) Date of Patent: Sep. 28, 2021

(54) HANGER BARS

(71) Applicant: GLENCORE TECHNOLOGY PTY LIMITED, Brisbane (AU)

(72) Inventors: Nigel Aslin, Brisbane (AU); Per Ola Eriksson, Annandale (AU)

(73) Assignee: GLENCORE TECHNOLOGY PTY LIMITED, Brisbane (AU)

( * ) Notice: Subject to any disclaimer, the term of this patent is extended or adjusted under 35 U.S.C. 154(b) by 0 days.

(21) Appl. No.: 16/331,220

(22) PCT Filed: Sep. 9, 2016

(86) PCT No.: PCT/AU2016/050849
§ 371 (c)(1),
(2) Date: Mar. 7, 2019

(87) PCT Pub. No.: WO2018/045407
PCT Pub. Date: Mar. 15, 2018

(65) Prior Publication Data
US 2019/0242023 A1 Aug. 8, 2019

(51) Int. Cl.
*C25C 7/02* (2006.01)
*B23K 35/30* (2006.01)
*C22C 9/01* (2006.01)
*B23K 9/173* (2006.01)
*B23K 9/23* (2006.01)
*B23K 35/02* (2006.01)
(Continued)

(52) U.S. Cl.
CPC .............. *C25C 7/02* (2013.01); *B23K 9/032* (2013.01); *B23K 9/167* (2013.01); *B23K 9/173* (2013.01); *B23K 9/232* (2013.01); *B23K 35/0261* (2013.01); *B23K 35/24* (2013.01); *B23K 35/302* (2013.01); *C22C 9/01* (2013.01); *C25C 1/12* (2013.01); *C25C 7/06* (2013.01); *B23K 2101/38* (2018.08); *B23K 2103/22* (2018.08)

(58) Field of Classification Search
CPC ............... C25C 7/02–7/025; C25C 1/00–1/14
See application file for complete search history.

(56) References Cited

U.S. PATENT DOCUMENTS 2,430,419 A * 11/1947 Edens ........................... 420/486
4,606,804 A * 8/1986 Schulke .................... C25C 7/02
204/288.2
(Continued)

FOREIGN PATENT DOCUMENTS

| CN | 203462145 U | 3/2014 |
| GB | 2474054 A | 4/2011 |
| WO | 2006/094355 A1 | 9/2006 |

OTHER PUBLICATIONS

International Search Report and Written Opinion, Appl. No. PCT/AU2016/050849, dated Jan. 19, 2017.
(Continued)

*Primary Examiner* — Alexander W Keeling
(74) *Attorney, Agent, or Firm* — Fox Rothschild LLP

(57) ABSTRACT

A hanger bar for an electrowinning cell, wherein hanger bar includes a bar portion and one or more contact portions adapted, in use, to be brought into contact with an electrical conductor. The contact portions are fabricated from an electrically conductive material, and a welded seal is formed between the bar portion and the contact portions in order to minimize corrosion.

12 Claims, 5 Drawing Sheets

(51) Int. Cl.
*B23K 9/032* (2006.01)
*B23K 9/167* (2006.01)
*C25C 1/12* (2006.01)
*C25C 7/06* (2006.01)
*B23K 35/24* (2006.01)
*B23K 101/38* (2006.01)
*B23K 103/22* (2006.01)

(56) References Cited

U.S. PATENT DOCUMENTS

| | | | | |
|---|---|---|---|---|
| 4,882,027 | A | * | 11/1989 | Borst .................. C25C 7/02 204/288.2 |
| 6,569,300 | B1 | * | 5/2003 | Assenmacher .......... C25C 7/02 204/280 |
| 2005/0126906 | A1 | | 6/2005 | Webb |
| 2005/0218006 | A1 | * | 10/2005 | Bonnafous ............... C25C 3/16 205/374 |
| 2009/0050488 | A1 | * | 2/2009 | Jickling ................... C25D 5/02 205/291 |
| 2012/0006679 | A1 | * | 10/2012 | Ellis et al. .......... B23K 20/129 204/280 |
| 2015/0240372 | A1 | | 8/2015 | Cerezo |

OTHER PUBLICATIONS

International Preliminary Report on Patentability, Appl. No. PCT/AU2016/050849, dated Aug. 3, 2018.
Office Action, Chinese Application No. 201680090478.5, dated Nov. 30, 2020.

* cited by examiner

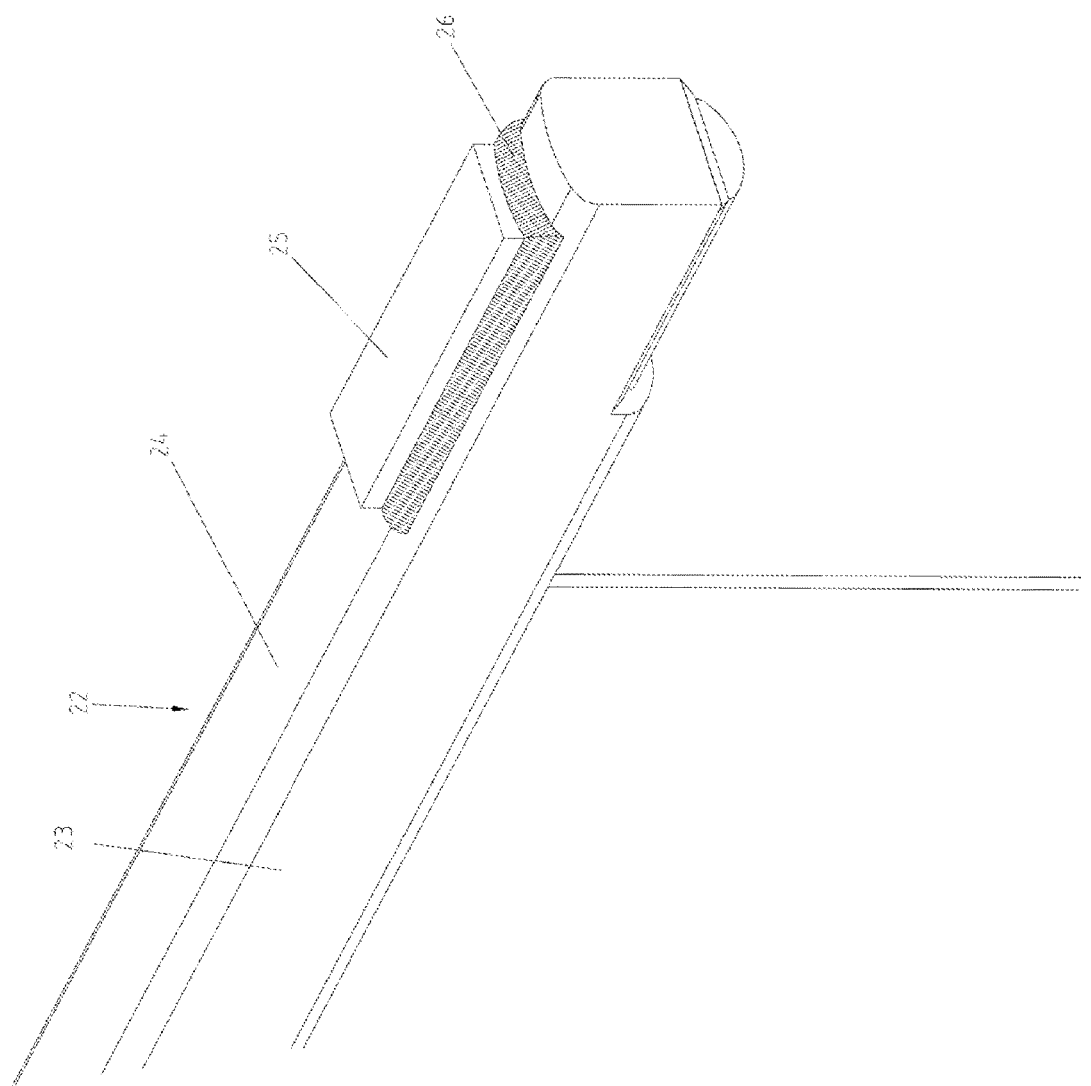

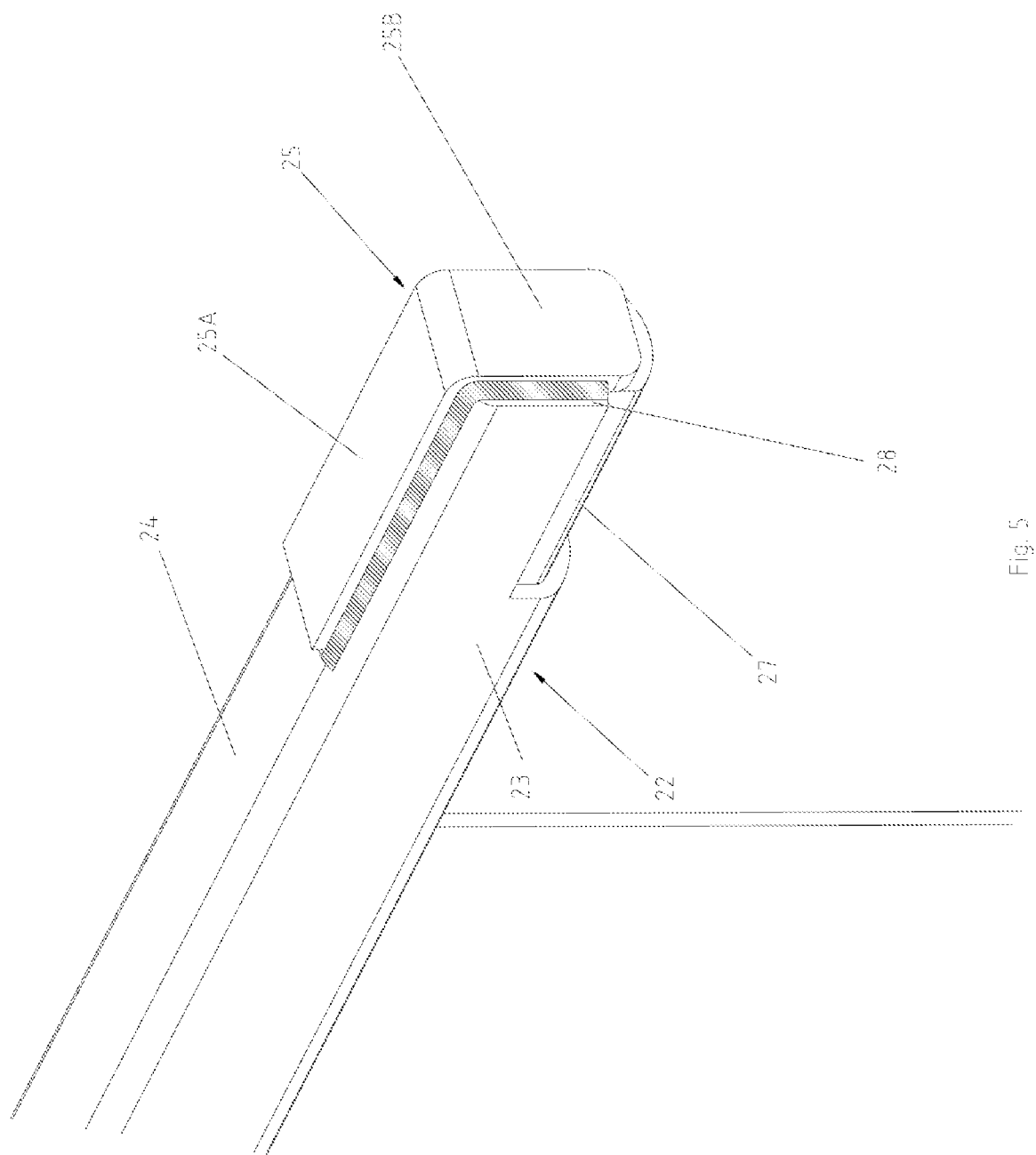

HANGER BARS

This application is a 371 filing of International Patent Application PCT/AU2016/050849 filed Sep. 9, 2016.

TECHNICAL FIELD

The present invention relates to improvements in hanger bars. In particular, the present invention is directed to improvements in hanger bars adapted to reduce corrosion in a tankhouse environment.

BACKGROUND ART

Electrowinning (or electrorefining) is a hydrometallurgical process for the recovery of metals from a solution by passing a current through the solution. Electrons from the current chemically reduce dissociated metal ions in the solution, thereby forming solid metal on a cathode located in the solution.

In conventional electrowinning circuits, cathodes are provided in the form of metal plates or sheets that are connected to hanger bars that suspend the cathode within the solution. The hanger bars include electrical contacts that are placed in contact with busbars located along the edges of electrowinning cells so as to form part of the electrical circuit within the cell. Typically, the outer surface of a hanger bar is fabricated from an electrically conductive material (such as copper). The hanger bar may be a solid copper bar, a hollow copper bar or a bar having an electroplated copper surface. Alternatively, the hanger bar may comprise copper shrouded in a corrosion resistant material (such as stainless steel or titanium) with the copper exposed at opposed ends thereof to form the electrical contacts.

However, corrosion (and particularly, chemical or galvanic corrosion) of the electrical contacts and the joints connecting the electrical contacts to the hanger bar (in the case of a bar of copper shrouded in a corrosion resistant material) may occur in a tankhouse environment due to the formation of acid or electrolyte mist in the electrowinning cell coming into contact with the hanger bar. This corrosion results in both reduced efficiency and a reduced service life for the cathode. In addition, when stainless steel cathode plates are joined to solid copper hanger bars, corrosion may occur at the joint between the plate and the hanger bar. In some cases, this corrosion can lead to the cathode plate becoming separated from the hanger bar within an electrowinning cell.

Thus, there would be an advantage if it were possible to provide a hanger bar with improved corrosion resistance properties.

It will be clearly understood that, if a prior art publication is referred to herein, this reference does not constitute an admission that the publication forms part of the common general knowledge in the art in Australia or in any other country.

SUMMARY OF INVENTION

The present invention is directed to improvements in hanger bars, which may at least partially overcome at least one of the abovementioned disadvantages or provide the consumer with a useful or commercial choice.

With the foregoing in view, the present invention resides broadly, in a first aspect thereof, in a hanger bar for an electrowinning cell, the hanger bar comprising a bar portion and one or more contact portions adapted, in use, to be brought into contact with an electrical conductor, the contact portions being fabricated from an electrically conductive material, and wherein a welded seal is formed between the bar portion and the contact portions in order to minimise corrosion.

Although the hanger bar has been described in terms of being used in an electrowinning cell, it will be understood that the term "electrowinning" may also include electrorefining processes within its scope.

The hanger bar may be of any suitable size, shape or configuration. It will be understood, however, that the hanger bar is preferably sized so as to extend between opposed edges of an electrowinning cell.

The bar portion may be of any suitable size and shape. For instance, the bar portion may have any suitable shape in cross-section, and may be circular, square, rectangular, oval or any other suitable shape. Similarly, the bar portion may comprise a solid bar or rod, or may be tubular.

In a preferred embodiment of the invention, the hanger bar may be adapted for connection to a cathode. In particular, the hanger bar may be adapted for connection to a cathode plate. It is envisaged that, during use, the cathode plate may be located within a solution in an electrowinning cell such that reduced metal from the solution may be deposited on the cathode plate.

The cathode plate may be formed integrally with the hanger bar, or may be formed separately therefrom and adapted for fixed or temporary connection thereto.

The bar portion may be fabricated from any suitable material. Preferably, however, the bar portion may be fabricated from an electrically conductive material. More preferably, the bar portion may be fabricated from a different electrically conductive material to the one or more contact portions.

In a preferred embodiment of the invention, the material from which the bar portion is fabricated may be a relatively corrosion resistant material. It will be understood that, in an electrowinning cell, the solution is often an acidic solution, and an acidic mist may be generated above an electrowinning cell, making the environment in an electrowinning tankhouse highly corrosive. Thus, it is preferred that the bar portion may be fabricated from a relatively corrosion resistant material.

Any suitable corrosion resistant material may be used, although in a preferred embodiment of the invention the corrosion resistant material is a metal or metal alloy. Any suitable metal may be used, such as titanium (or an alloy thereof). In a preferred embodiment of the invention, however, the bar portion may be fabricated from stainless steel. Any suitable grade of stainless steel may be used, although in a specific embodiment of the invention, 316 stainless steel or duplex stainless steel may be used.

The one or more contact portions may be of any suitable form. Preferably, however, the contact portions are adapted to be brought into contact with an electrical conductor located on an edge of the electrowinning cell. The electrical conductor may be of any suitable form, although in a preferred embodiment of the invention, the electrical conductor may be a busbar.

In a preferred embodiment of the invention, a busbar may be provided along at least a portion of opposed edges of the electrowinning cell. In this embodiment of the invention, the hanger bar may comprise a pair of contact portions, with a contact portion located at or adjacent each end of the bar portion.

As previously stated, the contact portions are fabricated from an electrically conductive material. Any suitable electrically conductive material may be used, and the electrically conductive material may be the same as that from which the bar portion is fabricated. More preferably, however, the contact portions may be fabricated from a different electrically conductive material to the bar portion. It is envisaged that the material from which the contact portions are fabricated may have a greater electrical conductivity than the bar portion.

While any suitable material may be used for the contact portions, it is preferred that the contact portions may be fabricated from a metal or metal alloy. In a particular embodiment of the invention, the contact portions may be fabricated from copper (or an alloy thereof).

The contact portions may be of any suitable size, shape or configuration. In a preferred embodiment of the invention, a contact portion may be located at or adjacent opposed ends of the bar portion. Specifically, a first end of each contact portion is located at or adjacent a respective end of the bar portion, and the contact portions extend towards the opposed ends of the bar portion.

The contact portions may each extend along only a portion of the length of the bar portion. Alternatively, in some embodiments of the invention, the contact portions form opposite ends of a single elongate contact member that extends between opposed ends of the hanger bar. In this embodiment of the invention, it is envisaged that the bar portion may be substantially tubular and that the elongate contact member may be located within the tubular bar portion. The elongate contact member may be a solid bar or rod, or may be tubular.

In an alternative embodiment of the invention, the contact portions may be attached to an outer surface of the bar portion. In this embodiment invention, the contact portions may comprise plates, discs, or the like that are attached to an outer surface of the bar portion using any suitable technique (such as, but not limited to, one or more fasteners, adhesives or the like), or may be connected to the bar portion using the seal.

While the contact portions may be housed at least partially within the bar portion, it is envisaged that, at or adjacent opposed ends of the bar portion, the contact portions may be exposed. By this it is meant that the contact portions may form an outer surface of the hanger bar at or adjacent opposed ends thereof. In this way, the contact portions may be brought into direct contact with an electrical conductor, such as a busbar.

Preferably, in use, contact portions comprise at least a lower portion of the hanger bar at opposed ends thereof. In this way, the contact portions may be brought into contact with electrical conductors located on the upper edges of the electrowinning cell.

The bar portion may include one or more cutaway portions therein that allow the contact portions to be exposed. Alternatively, in another embodiment of the invention, the contact portions may form opposed ends of the hanger bar with the bar portion extending between the contact portions. In this embodiment of the invention, the bar portion does not extend to the opposed ends of the hanger bar.

As previously stated, a welded seal is formed between the bar portion and the contact portions. The welded seal may be fabricated from any suitable material, although it would be understood that the purpose of the seal is to minimise corrosion of both the seal itself and the remainder of the hanger bar. In some embodiments of the invention, the seal may be fabricated from a metal, metal alloy, or mixture of metals or metal alloys. In a specific embodiment of the invention, the seal may be fabricated from aluminium bronze.

The welded seal may be formed using any suitable welding technique. In a preferred embodiment of the invention, the weld may be formed using a MIG welding technique or a TIG welding technique. Preferably, the MIG or TIG welding technique may be performed in the presence of argon and/or helium gas.

The seal may be formed using any suitable welding rod. Preferably, however, the seal is formed using a welding rod comprising at least 6.0 wt % aluminium. Preferably, the welding rod comprises between 6.0 wt % aluminium and 20 wt % aluminium. More preferably, the welding rod comprises between 7.0 wt % aluminium and 15 wt % aluminium. Yet more preferably, the welding rod comprises between 8.0 wt % aluminium and 12 wt % aluminium. Most preferably, the welding rod comprises between 8.5 wt % aluminium and 11 wt % aluminium.

In a preferred implement of the invention, the welding rod may also comprise copper. The copper may be present in any suitable quantity, although in a preferred embodiment of the invention, copper may be present in the welding rod in an amount of up to 94 wt %. Preferably, the welding rod comprises between 75 wt % copper and 94 wt % copper. More preferably, the welding rod comprises between 80 wt % copper and 92 wt % copper. Yet more preferably, the welding rod comprises between 85 wt % copper and 90 wt % copper. Most preferably, the welding rod comprises between 87 wt % copper and 89.5 wt % copper.

It will be understood that the welding rod may comprise small amounts of a number of other elements, including, but not limited to, the zinc, iron, silicon, lead, manganese and the like, or any suitable combination thereof. These elements may be present as impurities, or may be present to provide additional beneficial properties to the welded seal, such as corrosion resistance, mechanical strength, ductility or the like. It is envisaged that the total quantity of these other elements in the welding rod may be no more than about 5 wt %. In a specific embodiment of the invention, iron may be present in an amount of up to 2 wt % in the welding rod. More preferably, iron may be present in the welding rod in an amount of between 0.5 wt % and 1.5 wt %.

In a preferred embodiment of the invention the welding rod or wire used to form the welded seal comprises an aluminium bronze welding rod or wire. Any suitable aluminium bronze welding rod may be used, although in a preferred embodiment of the invention the aluminium bronze welding rod may comprise an aluminium bronze A2 welding rod, such as that manufactured by Wisconsin Wire Works, Inc.

Preferably, the seal may be formed at any location on the hanger bar where the bar portion and the contact portions meet. The seal may have any suitable width or thickness provided that the seal is sufficient to prevent acid or electrolyte mist from entering the interior of the hanger bar between the bar portion and the contact portions, whether due to insufficient sealing, weld porosity or corrosion of the seal. In addition, it is envisaged that the seal may be resistant to corrosion, and particularly to galvanic or chemical corrosion due to dissimilar metals in the seal, especially at the interface between the bar portion and the contact portions.

In some embodiments of the invention, the seal may also be formed on one or both opposed ends of the hanger bar. In this way, the seal may be used to form a cap on one or both opposed ends of the hanger bar.

In a second aspect, the invention resides broadly in an electrowinning cathode assembly comprising a hanger bar fabricated at least partly from an electrically conductive material and a cathode portion associated with the hanger bar, the cathode portion being connected to the hanger bar by an aluminium bronze joint.

The hanger bar may be of any suitable size, shape or configuration. It will be understood, however, that the hanger bar is preferably sized so as to extend between opposed edges of an electrowinning cell.

The hanger bar may be fabricated from any suitable electrically conductive material. Preferably however, the hanger bar may be manufactured from an electrically conductive metal, metal alloy or combination of metals or metal alloys. The metal or metal alloy may include silver, gold, aluminium, tungsten, zinc, nickel, steel, stainless steel, platinum, lead, tin, titanium or the like, or a combination thereof. Most preferably however, the hanger bar may be manufactured from copper or an alloy thereof.

The hanger bar may be of any suitable size and shape. For instance, the hanger bar may have any suitable shape in cross-section, and may be circular, square, rectangular, oval or any other suitable shape. Similarly, the hanger bar may comprise a solid bar or rod, or may be tubular.

As previously stated, the hanger bar is associated with a cathode portion. The cathode portion may be of any suitable size, shape or configuration, although in a preferred embodiment of the invention the cathode portion comprises a plate. It is envisaged that, during use, the cathode plate may be located within a solution in an electrowinning cell such that reduced metal from the solution may be deposited on the cathode.

The cathode plate may be formed integrally with the hanger bar. More preferably, however, the cathode plate may be formed separately to the hanger bar and adapted for fixed or temporary connection thereto. In this embodiment of the invention, it is envisaged that the cathode plate may be fabricated from a different material to the hanger bar.

The cathode plate may be fabricated from any suitable material, although it is envisaged that, as the cathode plate will be located in an acidic electrolyte solution within an electrowinning cell, that the cathode plate will be fabricated from a relatively corrosion resistant material. In addition, it is preferred that the cathode plate may be manufactured from a material that is relatively chemically inert. In some embodiments of the invention, the cathode plate may be fabricated from titanium or similar metal. More preferably, however, the cathode plate may be fabricated from stainless steel. Any suitable grade of stainless steel may be used.

As previously stated, a joint is formed between the hanger bar and the cathode. The joint may be fabricated from any suitable material, although it would be understood that the purpose of the joint may be to minimise corrosion of the joint that could lead to separation of the cathode plate from the hanger bar. Corrosion of the joint may also lead to reduced electrical conductivity in the cathode assembly, thereby adversely affecting the performance of the cathode assembly in the electrowinning process.

In addition, corrosion of the joint may cause a mechanical failure of the cathode assembly: it is envisaged that, in use, a significant weight of metal (for instance 200 kg or more) may be electrodeposited onto the cathode plate, meaning that damage to or corrosion of the joint may reduce the mechanical strength of the joint, thereby leading to separation of the cathode plate from the hanger bar. Thus, it is envisaged that the joint may be of sufficient mechanical strength to support the weight of the cathode plate and deposited metal thereon.

The joint may be formed using any suitable technique. In a preferred embodiment of the invention, the joint may be formed using a welding technique, such as a MIG welding technique or a TIG welding technique. Preferably, the MIG or TIG welding technique may be performed in the presence of argon and/or helium gas. It is envisaged, however, that the weld may also be formed by other metal fusion methods, such as, but not limited to, cold-metal spraying, hybrid welding, plasma spraying, 3D spraying and the like, or any suitable combination thereof.

Preferably, the joint may be formed at any location on the cathode assembly where the hanger bar and the cathode portion meet. Thus, it is envisaged that the joint may extend across the entire width of the cathode portion where it meets the hanger bar. The joint may have any suitable width or thickness provided that the joint is sufficient to prevent acid or electrolyte mist from causing corrosion at the junction between the hanger bar and the cathode portion, whether due to insufficient sealing, weld porosity or corrosion of the seal. In addition, it is envisaged that the joint may be resistant to corrosion, and particularly to galvanic or chemical corrosion due to dissimilar metals in the joint, especially at the interface between the hanger bar and the cathode portion.

In embodiments of the invention in which the joint comprises a weld, any suitable weld may be formed between the hanger bar and the cathode portion. In a preferred embodiment of the invention, however, the weld may be a fillet weld. The fillet weld may extend continuously along the entire width of the cathode plate on one or both sides of the cathode plate, or an intermittent fillet weld may be provided on one or both sides of the cathode plate. By intermittent fillet weld, it is meant that a plurality of discrete spaced apart welds are provided on one or both sides of the cathode plate. Most preferably, however, a continuous fillet weld may be provided across the entire width of the cathode plate on both sides thereof.

As previously stated, the joint is an aluminium bronze joint. In embodiments of the invention in which the joint is formed by welding, it is envisaged that the joint may be formed using a welding rod or wire comprising at least 6.0 wt % aluminium. Preferably, the welding rod comprises between 6.0 wt % aluminium and 20 wt % aluminium. More preferably, the welding rod comprises between 7.0 wt % aluminium and 15 wt % aluminium. Yet more preferably, the welding rod comprises between 8.0 wt % aluminium and 12 wt % aluminium. Most preferably, the welding rod comprises between 8.5 wt % aluminium and 11 wt % aluminium.

In a preferred implement of the invention, the welding rod may also comprise copper. The copper may be present in any suitable quantity, although in a preferred embodiment of the invention, copper may be present in the welding rod in an amount of up to 94 wt %. Preferably, the welding rod comprises between 75 wt % copper and 94 wt % copper. More preferably, the welding rod comprises between 80 wt % copper and 92 wt % copper. Yet more preferably, the welding rod comprises between 85 wt % copper and 90 wt % copper. Most preferably, the welding rod comprises between 87 wt % copper and 89.5 wt % copper.

It will be understood that the welding rod may comprise small amounts of a number of other elements, including, but not limited to, zinc, iron, silicon, lead, manganese and the like, or any suitable combination thereof. These elements may be present as impurities, or may be present to provide additional beneficial properties to the welded joint, such as corrosion resistance, mechanical strength, ductility or the like. It is envisaged that the total quantity of these other elements in the welding rod may be no more than about 5 wt %. In a specific embodiment of the invention, iron may be present in an amount of up to 2 wt % in the welding rod. More preferably, iron may be present in the welding rod in an amount of between 0.5 wt % and 1.5 wt %.

In embodiments of the invention in which the joint comprises a weld, it is envisaged that any suitable welding rod or wire may be used to form the weld. However, in a preferred embodiment of the invention the welding rod or wire comprises an aluminium bronze welding rod or wire. Any suitable aluminium bronze welding rod may be used, although in a preferred embodiment of the invention the aluminium bronze welding rod may comprise an aluminium bronze A2 welding rod, such as that manufactured by Wisconsin Wire Works, Inc.

In a third aspect, the invention resides broadly in a hanger bar for an electrowinning cell, the hanger bar being at least fabricated from an electrically conductive material, wherein the hanger bar includes one or more shorting frame contacts located thereon, and wherein a welded seal is formed between the hanger bar and the one or more shorting frame contacts in order to minimise corrosion.

The hanger bar may be of any suitable size, shape or configuration. It will be understood, however, that the hanger bar is preferably sized so as to extend between opposed edges of an electrowinning cell.

The hanger bar may be fabricated from any suitable electrically conductive material. Preferably however, the hanger bar may be manufactured from an electrically conductive metal, metal alloy or combination of metals or metal alloys. The metal or metal alloy may include silver, gold, aluminium, tungsten, zinc, nickel, steel, platinum, lead, tin, titanium or the like, or a combination thereof. Most preferably however, the hanger bar may be manufactured from stainless steel. Any suitable grade of stainless steel may be used. In this aspect of the invention, the hanger bar is not fabricated from copper.

The hanger bar may be of any suitable size and shape. For instance, the hanger bar may have any suitable shape in cross-section, and may be circular, square, rectangular, oval or any other suitable shape. Similarly, the hanger bar may comprise a solid bar or rod, or may be tubular.

It will be understood that, in electrowinning plants, a shorting frame is a device that allows current to be bypassed around electrowinning cells in which maintenance needs to be carried out. Typically, a shorting frame is placed on top of the cathode assemblies in electrowinning cells on either side of the cell or cells where maintenance is required.

At present, the use of a shorting frame is limited to electrowinning cells in which the hanger bars are fabricated from copper, and the shorting frame is lowered directly onto the copper hanger bars, and the accepted belief within the art is that the use of shorting frames is not suitable with cathode assemblies comprising stainless steel hanger bars. However, the present applicant has found a way in which a shorting frame may be used in conjunction with stainless steel hanger bars.

In a preferred embodiment of the invention, the shorting frame contacts may be fabricated from an electrically conductive material. Any suitable electrically conductive material may be used, and the electrically conductive material may be the same as that from which the hanger bar is fabricated. More preferably, however, the shorting contact portions may be fabricated from a different electrically conductive material to the bar portion. It is envisaged that the material from which the contact portions are fabricated may have a greater electrical conductivity than the hanger bar.

While any suitable material may be used for the shorting frame contacts, it is preferred that the shorting frame contacts may be fabricated from a metal or metal alloy. In a particular embodiment of the invention, the shorting frame contacts may be fabricated from copper (or an alloy thereof).

The shorting frame contacts may be of any suitable size, shape or configuration. In a preferred embodiment of the invention, a shorting frame contact may be located at or adjacent opposed ends of the hanger bar. Specifically, a first end of each shorting frame contact is located at or adjacent a respective end of the hanger bar, and the shorting frame contacts may be located towards the opposed ends of the bar portion.

Preferably, the shorting frame contacts may each extend along only a portion of the length of the hanger bar. Alternatively, in some embodiments of the invention, the shorting frame contacts may form opposite ends of a single elongate shorting frame contact member that extends between opposed ends of the hanger bar. In this embodiment of the invention, it is envisaged that the hanger bar may be substantially tubular and that the elongate shorting frame contact member may be located within the tubular bar portion. The elongate shorting frame contact member may be a solid bar or rod, or may be tubular.

In an alternative embodiment of the invention, the shorting frame contacts may be attached to an outer surface of the hanger bar. In this embodiment invention, the shorting frame contacts may comprise plates, discs, or the like that are attached to an outer surface of the hanger bar using any suitable technique (such as, but not limited to, one or more fasteners, adhesives or the like), or may be connected to the hanger bar using the welded seal.

While the shorting frame contacts may be housed at least partially within the hanger bar, it is envisaged that, at or adjacent opposed ends of the hanger bar, the shorting frame contacts may be exposed. By this it is meant that the shorting frame contacts may form an outer surface of the hanger bar at or adjacent opposed ends thereof. In this way, the shorting frame contacts may be brought into direct contact with a shorting frame. The hanger bar may include one or more cutaway portions therein that allow the shorting frame contacts to be exposed.

Preferably, in use, the shorting frame contacts comprise at least an upper portion of the hanger bar at opposed ends thereof. In this way, the shorting frame contacts may be brought into contact with a shorting frame placed on top of the cathode assemblies in an electrowinning cell. The shorting frame contacts may extend along any suitable length of the upper portion of the hanger bar.

In other embodiments of the invention, the shorting frame contacts may be located on an upper portion of the hanger bar and may extend onto an end of the hanger bar. In some embodiments of the invention, the hanger bay may comprise a contact portion on a lower portion of the hanger bar and a shorting frame contact on an upper portion of the hanger bar (and, optionally, on the end of the hanger bar).

As previously stated, a welded seal is formed between the hanger bar and the shorting frame contacts. The seal may be fabricated from any suitable material, although it would be understood that the purpose of the seal is to minimise corrosion of both the seal itself and the hanger bar and shorting frame contacts. In some embodiments of the invention, the seal may be fabricated from a metal, metal alloy, or mixture of metals or metal alloys. In a specific embodiment of the invention, the seal may be fabricated from aluminium bronze.

The welded seal may be formed using any suitable welding technique. In a preferred embodiment of the invention, the weld may be formed using a MIG welding technique or a TIG welding technique. Preferably, the MIG or TIG welding technique may be performed in the presence of argon and/or helium gas.

The welded seal may be formed using any suitable welding rod. Preferably, however, the seal is formed using a welding rod comprising at least 6.0 wt % aluminium. Preferably, the welding rod comprises between 6.0 wt % aluminium and 20 wt % aluminium. More preferably, the welding rod comprises between 7.0 wt % aluminium and 15 wt % aluminium. Yet more preferably, the welding rod comprises between 8.0 wt % aluminium and 12 wt % aluminium. Most preferably, the welding rod comprises between 8.5 wt % aluminium and 11 wt % aluminium.

In a preferred implement of the invention, the welding rod may also comprise copper. The copper may be present in any suitable quantity, although in a preferred embodiment of the invention, copper may be present in the welding rod in an amount of up to 94 wt %. Preferably, the welding rod comprises between 75 wt % copper and 94 wt % copper. More preferably, the welding rod comprises between 80 wt % copper and 92 wt % copper. Yet more preferably, the welding rod comprises between 85 wt % copper and 90 wt % copper. Most preferably, the welding rod comprises between 87 wt % copper and 89.5 wt % copper.

It will be understood that the welding rod may comprise small amounts of a number of other elements, including, but not limited to, the zinc, iron, silicon, lead, manganese and the like, or any suitable combination thereof. These elements may be present as impurities, or may be present to provide additional beneficial properties to the welded seal, such as corrosion resistance, mechanical strength, ductility or the like. It is envisaged that the total quantity of these other elements in the welding rod may be no more than about 5 wt %. In a specific embodiment of the invention, iron may be present in an amount of up to 2 wt % in the welding rod. More preferably, iron may be present in the welding rod in an amount of between 0.5 wt % and 1.5 wt %.

In embodiments of the invention in which the seal comprises a weld, it is envisaged that any suitable welding rod or wire may be used to form the weld. However, in a preferred embodiment of the invention the welding rod and wire comprises an aluminium bronze welding rod or wire. Any suitable aluminium bronze welding rod may be used, although in a preferred embodiment of the invention the aluminium bronze welding rod may comprise an aluminium bronze A2 welding rod, such as that manufactured by Wisconsin Wire Works, Inc.

Preferably, the seal may be formed at any location where the hanger bar and the shorting frame contacts meet. The seal may have any suitable width or thickness provided that the seal is sufficient to prevent acid or electrolyte mist from penetrating the seal, whether due to insufficient sealing, weld porosity or corrosion of the seal. In addition, it is envisaged that the seal may be resistant to corrosion, and particularly to galvanic corrosion due to dissimilar metals in the seal, especially at the interface between the hanger bar and the shorting frame contacts.

In some embodiments of the invention, the hanger bar may further comprise one or more contact portions. The one or more contact portions may be of any suitable form. Preferably, however, the contact portions are adapted to be brought into contact with an electrical conductor located on an edge of the electrowinning cell. The electrical conductor may be of any suitable form, although in a preferred embodiment of the invention, the electrical conductor may be a busbar.

In a preferred embodiment of the invention, a busbar may be provided along at least a portion of opposed edges of the electrowinning cell. In this embodiment of the invention, the hanger bar may comprise a pair of contact portions, with a contact portion located at or adjacent each end of the bar portion.

The contact portions are preferably fabricated from an electrically conductive material. Any suitable electrically conductive material may be used, and the electrically conductive material may be the same as that from which the bar portion is fabricated. More preferably, however, the contact portions may be fabricated from a different electrically conductive material to the bar portion. It is envisaged that the material from which the contact portions are fabricated may have a greater electrical conductivity than the bar portion.

While any suitable material may be used for the contact portions, it is preferred that the contact portions may be fabricated from a metal or metal alloy. In a particular embodiment of the invention, the contact portions may be fabricated from copper (or an alloy thereof).

The contact portions may be of any suitable size, shape or configuration. In a preferred embodiment of the invention, a contact portion may be located at or adjacent opposed ends of the bar portion. Specifically, a first end of each contact portion is located at or adjacent a respective end of the bar portion, and the contact portions extend towards the opposed ends of the bar portion.

The contact portions may each extend along only a portion of the length of the bar portion. Alternatively, in some embodiments of the invention, the contact portions form opposite ends of a single elongate contact member that extends between opposed ends of the hanger bar. In this embodiment of the invention, it is envisaged that the bar portion may be substantially tubular and that the elongate contact member may be located within the tubular bar portion. The elongate contact member may be a solid bar or rod, or may be tubular.

In an alternative embodiment of the invention, the contact portions may be attached to an outer surface of the bar portion. In this embodiment invention, the contact portions may comprise plates, discs, or the like that are attached to an outer surface of the bar portion using any suitable technique (such as, but not limited to, one or more fasteners, adhesives or the like), or may be connected to the bar portion using the seal.

While the contact portions may be housed at least partially within the bar portion, it is envisaged that, at or adjacent opposed ends of the bar portion, the contact portions may be exposed. By this it is meant that the contact portions may form an outer surface of the hanger bar at or adjacent opposed ends thereof. In this way, the contact portions may be brought into direct contact with an electrical conductor, such as a busbar.

Preferably, in use, contact portions comprise at least a lower portion of the hanger bar at opposed ends thereof. In this way, the contact portions may be brought into contact with electrical conductors located on the upper edges of the electrowinning cell.

The bar portion may include one or more cutaway portions therein that allow the contact portions to be exposed. Alternatively, in another embodiment of the invention, the contact portions may form opposed ends of the hanger bar with the bar portion extending between the contact portions. In this embodiment of the invention, the bar portion does not extend to the opposed ends of the hanger bar.

The contact portions and the shorting frame contacts may form parts of the same member. More preferably, however, the contact portions and the shorting frame contacts are formed separately therefrom. More preferably, the contact portions and the shorting frame contacts are located on the hanger bar spaced apart from one another so that the contact portions and the shorting frame portions are not brought into contact with one another.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

EXAMPLE

In a specific example of the invention, a test piece was fabricated for a corrosion test. The test piece comprised a length of tubular 316 stainless steel having the chemical composition shown in Table 1 below MIG welded in an argon atmosphere to a piece of 99.9 wt % pure copper using an A2 aluminium bronze welding rod having the composition shown in Table 2.

TABLE 1

| Chemical composition of 316 stainless steel | | | | | | | | | |
|---|---|---|---|---|---|---|---|---|---|
| wt % Cr | wt % Ni | wt % C | wt % Mn | wt % Si | wt % P | wt % S | wt % N | wt % Mo | wt % Fe |
| 16-18 | 10-14 | 0.08 | 2 | 0.75 | 0.045 | 0.03 | 0.10 | 2.0-3.0 | balance |

TABLE 2

| Chemical composition of A2 aluminium bronze welding rod | | |
|---|---|---|
| wt % Cu | wt % Al | wt % Fe |
| 88 | 9 | 1 |

The test piece was placed in sulphuric acid electrolyte for a period of 6 days to simulate the corrosive environment found in an electrowinning tankhouse. At the end of the test period, the test piece was removed from the electrolyte. It was observed that no corrosion of the the aluminium bronze weld has taken place, and the test piece was substantially unchanged from its initial condition.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 4 illustrates hanger bars for an electrowinning cell according to an embodiment of the present invention.

FIG. 5 illustrates a hanger bar for an electrowinning cell according to an embodiment of the present invention.

DESCRIPTION OF EMBODIMENTS

Figure 1:
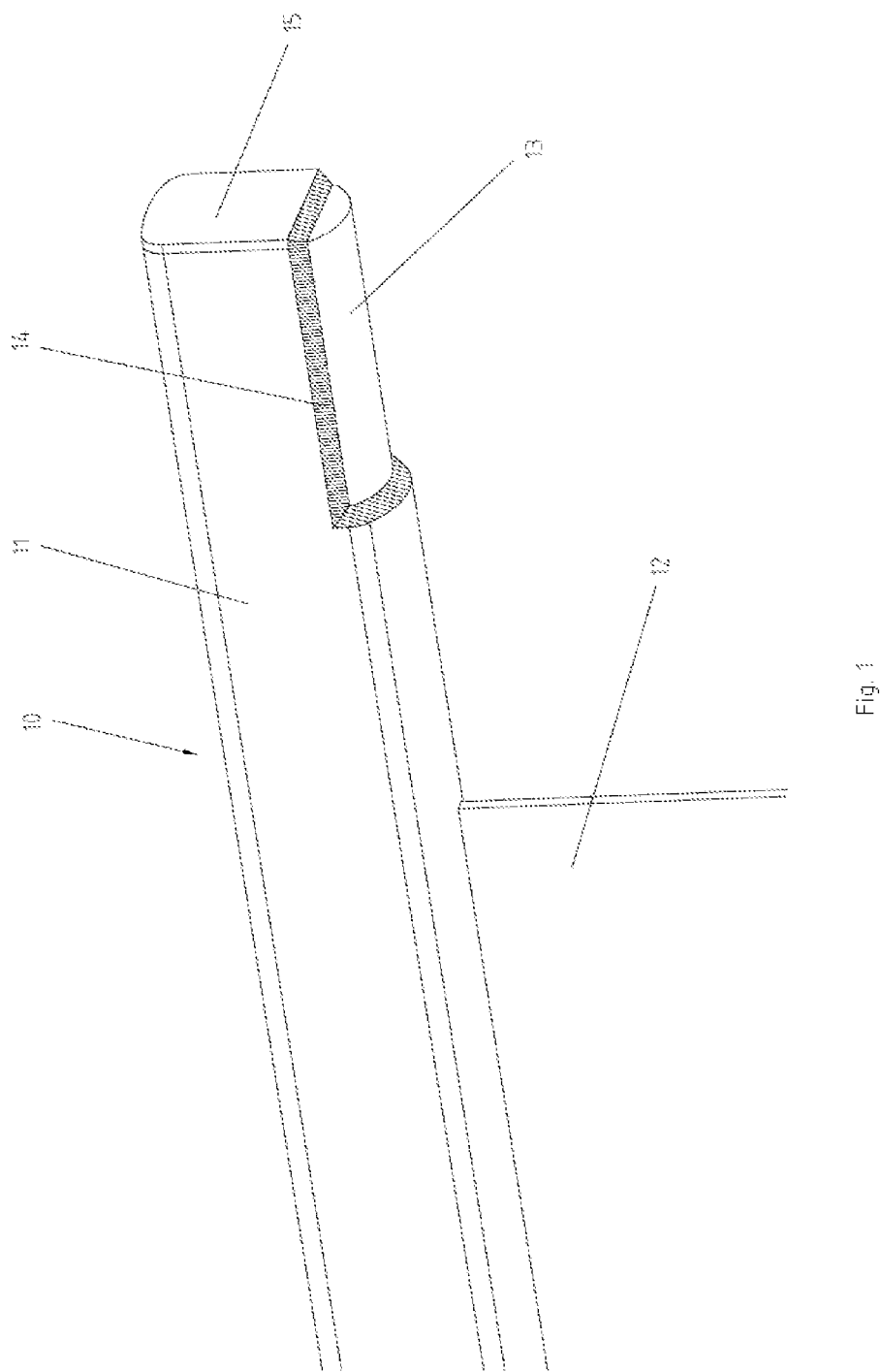
FIG. 1 illustrates a hanger bar for an electrowinning cell according to an embodiment of the present invention.

In FIG. 1 there is illustrated a hanger bar 10 for an electrowinning cell according to an embodiment of the present invention. The hanger bar 10 comprises a bar portion 11 that extends between opposed sides of an electrowinning cell (not shown). A cathode plate 12 is connected to and supported by the bar portion 11. In use, the bar portion 11 is located above the electrowinning cell (not shown) while the cathode plate 12 is suspended within the solution in the cell so that metal ions in the solution are deposited onto the cathode plate 12.

The solution in an electrowinning cell is typically strongly acidic, and acid vapour is generated, thereby creating a hostile environment within a tankhouse. In the embodiment of the invention illustrated in FIG. 1, the bar portion 11 is fabricated from stainless steel in order to minimise or eliminate corrosion of the bar portion 11 in this hostile environment.

The bar portion 11 is provided with a contact portion 13 at an end thereof (a second contact portion is provided at the opposite end of the bar portion). The contact portion 13 is fabricated from a material having a greater electrical conductivity than that of the bar portion 11. In this embodiment of the invention, the contact portion 13 is fabricated from copper.

In use, the contact portion 13 is placed on an edge of the electrowinning cell (not shown) along which an electrical busbar (not shown) extends. The contact portion 13 will be placed so as to contact the busbar (not shown) so that an electrical current passes through the hanger bar and cathode plate 12 and into the solution, thereby creating favourable conditions for the reduction of metal ions in the solution and the electrodeposition of metal on the cathode plate 12.

The contact portion 13 is a copper plate that is welded to the bar portion 11. However, in prior art hanger bars, significant corrosion takes places in the weld, due to weld porosity or galvanic corrosion (due to the different galvanic potential of the materials used in the weld and the hanger bar). In these situations, corrosion of the weld leads to a reduction in the performance of the cathode (i.e. a reduced deposition of metal on the cathode plate) due to a reduction in the electrical connection between the contact portion and the bar portion. In addition, corrosion can reduce the structural integrity of the hanger bar, with the possibility of the contact portion becoming detached from the bar portion.

In the embodiment of the invention shown in FIG. 1, a seal 14 is formed between the contact portion 13 and the bar portion 11. The seal 14 is a weld that extends about the entire boundary between the contact portion 13 and the bar portion 11, including onto the end 15 of the hanger bar 10.

In FIG. 1, the bar portion 11 is formed from 316 grade stainless steel, while the contact portion 13 is formed from 99.6 wt % pure copper. The seal 14 is formed by TIG welding in an argon atmosphere using an A2 aluminium bronze welding rod comprising approximately 88 wt % copper, 9 wt % aluminium and 1 wt % iron.

Figure 2:
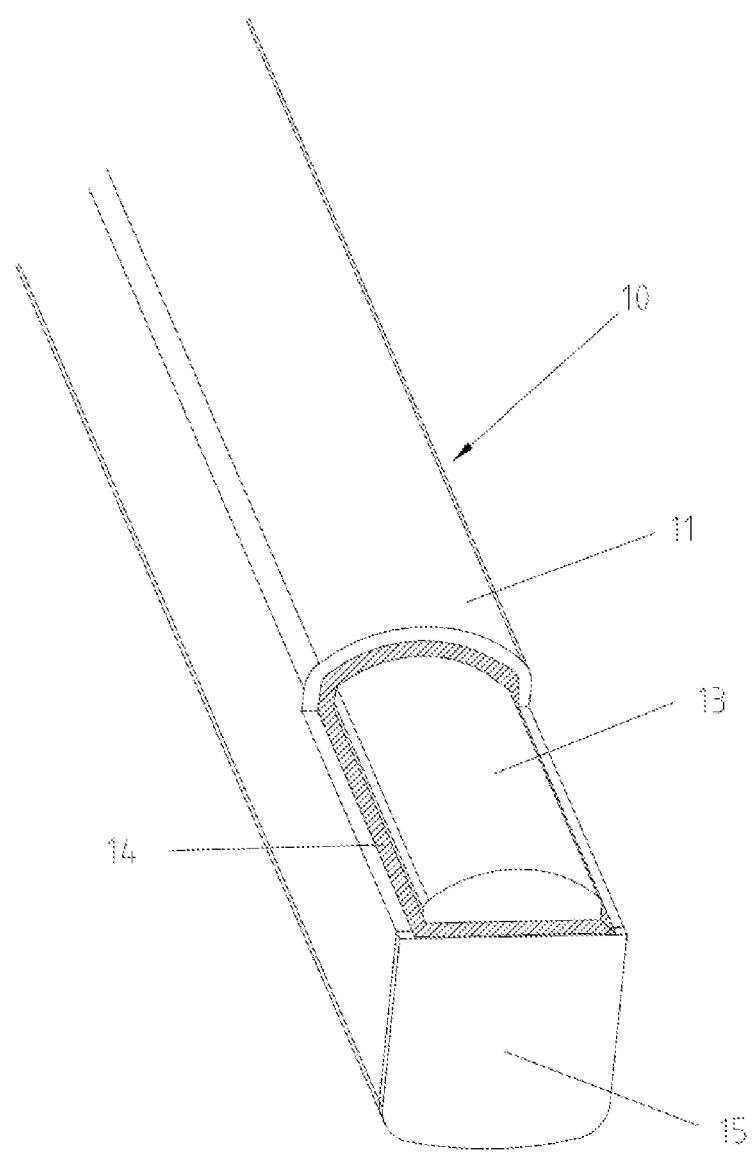
FIG. 2 illustrates hanger bars for an electrowinning cell according to an embodiment of the present invention.

In FIG. 2, a detailed view of the end 15 of a hanger bar 10 according to an embodiment of the invention is illustrated. In this Figure, the copper contact portions the welded seal 14 formed between the copper contact portions 13 and the stainless steel bar portions 11 may be clearly seen. It may also be seen that the seal 14 extends onto the ends 15 of the hanger bars 10.

Figure 3:
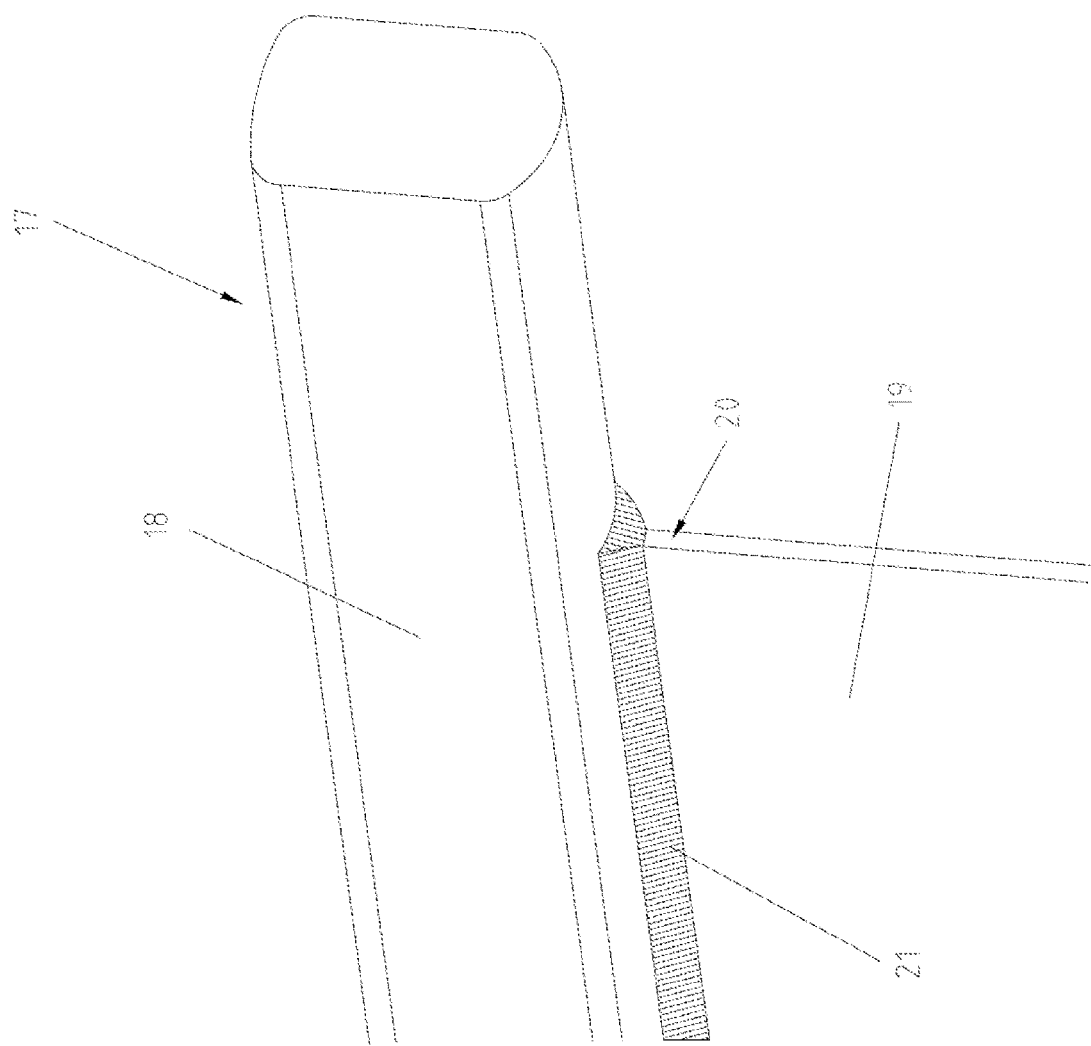
FIG. 3 illustrates details of an electrowinning cathode assembly according to an embodiment of the present invention.

FIG. 3 illustrates details of an electrowinning cathode assembly 17 according to an embodiment of the present invention. The cathode assembly 17 comprises a hanger bar 18 and a cathode plate 19 extending therefrom.

In this embodiment of the invention, the hanger bar 18 is formed from copper (and, in particular, 99.9 wt % pure copper) while the cathode plate 19 is formed from stainless steel (and, in particular, 316 grade stainless steel).

Although not illustrated in FIG. 3, the ends of the hanger bar 18 extend beyond the sides 20 of the cathode plate 19 so that the hanger bar 18 may be brought into contact with busbars (not shown) located on edges of the electrowinning cell (not shown) in which the cathode assembly 17 is used. In use, the hanger bar 18 will be suspended above the electrowinning cell (not shown), while the cathode plate 19 will be at least partially submerged within the electrolyte solution within the cell so that metal may be electrodeposited onto the cathode plate 19.

The cathode plate 19 is connected to the hanger bar 18 via a continuous fillet weld 21 that extends along the entire width of both faces of the cathode plate 19. As shown in FIG. 3, the fillet weld 21 also extends along the point at which the edges 20 of the cathode plate 19 meet the hanger bar 18. The fillet weld 21 is formed by TIG welding in an argon atmosphere using an A2 aluminium bronze welding rod comprising approximately 88 wt % copper, 9 wt % aluminium and 1 wt % iron.

The fillet weld 21 reduces or eliminates corrosion in the cathode assembly 17 (particularly galvanic corrosion caused by the different materials used in the cathode assembly 17 by providing a seal between the cathode plate 19 and the hanger bar 18. In addition, the fillet weld 21 provides the cathode assembly 17 with structural strength: it is not unusual for 200 kg of metal to be electrodeposited onto a cathode plate 19, meaning that the fillet weld 21 must be of sufficient strength to support the weight of the cathode plate 19 and deposited metal without fracturing or breaking so that the cathode plate 19 separates from the hanger bar 18.

In FIG. 4, a hanger bar 22 for an electrowinning cell according to an embodiment of the present invention is illustrated. The hanger bar 22 includes a bar portion 23 provided with contact portions (obscured) at opposed ends thereof and on what, in use, would be the lower surface of the hanger bars 22.

The upper surfaces 24 of the bar portions 23 are provided with shorting frame contacts 25, with a shorting frame contact 25 provided at or adjacent opposed ends of the bar portions 23. In use, a shorting frame (not shown) is placed onto each cathode assembly within an electrowinning cell on either side of an electrowinning cell in which maintenance is to be performed. The use of shorting frames isolates the electrowinning cell to be maintained without necessitating the shutting down of every cell in the electrical circuit.

The shorting frame contacts 25 are fabricated from copper (and, in particular, 99.9 wt % pure copper) while the bar portions 23 are formed from stainless steel (and, in particular, 316 grade stainless steel or duplex stainless steel).

The shorting frame contacts 25 are copper plates that are welded to the bar portions 23. It is envisaged that, without the aluminium bronze weld of the present invention, significant corrosion may take places at the interface between the shorting frame contacts 25 and the bar portions 23 due to chemical or galvanic corrosion (due to the different galvanic potential of the materials used in the weld and the hanger bar). In this situation, it is envisaged that corrosion would lead to a reduction in the performance of the cathode due to a reduction in the electrical connection between the shorting frame contacts and the bar portion. In addition, corrosion can reduce the structural integrity of the hanger bar, with the possibility of the shorting frame contacts becoming detached from the bar portion.

In the embodiment of the invention shown in FIG. 4, a seal 26 is formed between the shorting frame contacts 25 and the bar portions 23. The seal 26 is a weld that extends about the entire boundary between the shorting frame contact 25 and the bar portion 23.

In FIG. 4, the seal 14 is formed by TIG welding in an argon atmosphere using an A2 aluminium bronze welding rod comprising approximately 88 wt % copper, 9 wt % aluminium and 1 wt % iron.

In the embodiment of the invention illustrated in FIG. 4, contact portions (obscured) are located on the opposed face of the hanger bars 22 to the shorting frame contacts 25. In this embodiment of the invention, the contact portions (obscured) and the shorting frame contacts 25 do not comprise portions of the same copper rod extending through the hollow bar portion 23. Instead, the shorting frame contacts 25 comprise copper plates that are formed separately from the contact portions (obscured) and are maintained a distance therefrom by at least the wall thickness of the bar portion 23.

In FIG. 5, a hanger bar 22 for an electrowinning cell according to an embodiment of the present invention is illustrated. The hanger bar 22 is similar to that illustrated in FIG. 4, in that it comprises a bar portion 23 fabricated from stainless steel (and, in particular 316 grade stainless steel) and a contact portion 27 fabricated from copper (and, in particular 99.9 wt % pure copper) welded to, in use, a lower surface of the bar portion 23. In use, the contact portion 27 is brought into contact with an electrical conductor in the form of a busbar (not shown) that extends along an edge of the electrowinning cell.

The hanger bar 22 also includes a shorting frame contact 25 located on an upper surface 24 of the bar portion 23. The shorting frame contact 25 is fabricated from copper (and, in particular, 99.9 wt % pure copper), and, in use, a shorting frame (not shown) is placed on top of the shorting frame contact 25 in order to electrically isolate an adjacent electrowinning cell.

In contrast to the hanger bar 22 illustrated in FIG. 4, the shorting frame contact 25 of FIG. 5 is an L-shaped member that includes a first section 25A that extends along a portion of the upper surface 24 of the bar portion 22 and a second section 25B located at a right angle to the first portion 25A that extends so as to cover at least a portion of the end 28 of the bar portion 22.

Although not illustrated in FIG. 5, both the contact portion 27 and the shorting frame contact 25 are connected to the bar portion 22 using a seal that is provided at any location in which the contact portion 27 and the shorting frame contact 25 meet the bar portion 22. The seal is formed by TIG welding in an argon atmosphere using an A2 aluminium bronze welding rod comprising approximately 88 wt % copper, 9 wt % aluminium and 1 wt % iron.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

What is claimed is:

1. A hanger bar for an electrowinning cell or an electrorefining cell for recovery of metals from a solution by passing a current through the solution, the hanger bar being placed in electrical contact with busbars located along edges of the cell, the hanger bar suspending a cathode within the solution, the hanger bar comprising:
   a bar made from stainless steel, the bar having a recessed and open region formed at a lower side of each end of the bar, each of the recessed and open regions extending inwardly from an end of the bar; and
   a contact member comprising a copper busbar, the contact member extending between opposed ends of the bar, wherein respective ends of the contact member are exposed at the recessed and open end regions at either end of the bar, the copper having a higher electrical conductivity than the stainless steel,
   with the exposed ends of the copper being welded to a peripheral portion of the recessed and open regions of the bar, wherein a welded seal is formed between the stainless steel of the bar portion and the copper of the contact portions in order to minimize corrosion,
   wherein the welded seal is an aluminum bronze weld formed using an aluminum bronze welding rod or wire.

2. The hanger bar according to claim 1, which includes one or more shorting frame contacts located thereon, and wherein a welded seal is formed between the hanger bar and the one or more shorting frame contacts in order to minimize corrosion.

3. The hanger bar according to claim 2, wherein the welded seal between the hanger bar and the one or more shorting frame contacts is an aluminum bronze weld.

4. The hanger bar according to claim 2, wherein the weld is formed using an aluminum bronze welding rod or wire.

5. The hanger bar according to claim 2, wherein the shorting frame contacts are fabricated from copper.

6. The hanger bar according to claim 2, wherein, in use, the shorting frame contacts are located on an upper surface of the hanger bar.

7. The hanger bar according to claim 6, wherein, in use, the shorting frame contacts extend to cover at least a portion of an end of the hanger bar.

8. The electrowinning cathode assembly according to claim 1 wherein the welded seal is achieved using a welding rod or a welding wire comprising 75 to 94 wt % copper, 8.5 to 11 wt % aluminum and 0.5 to 1.5 wt % iron, with a total of iron plus other elements being no more than 5 wt %.

9. An electrowinning cathode assembly comprising a hanger bar as claimed in claim 1, and a cathode portion connected to the hanger bar by an aluminum bronze joint.

10. The electrowinning cathode assembly according to claim 9, wherein the joint comprises a fillet weld.

11. The electrowinning cathode assembly according to claim 10, wherein the fillet weld is formed using an aluminum bronze welding rod or wire.

12. The electro winning cathode assembly according to claim 9, wherein the cathode portion comprises a cathode plate.

* * * * *

UNITED STATES PATENT AND TRADEMARK OFFICE
CERTIFICATE OF CORRECTION

| | |
|---|---|
| PATENT NO. | : 11,131,034 B2 |
| APPLICATION NO. | : 16/331220 |
| DATED | : September 28, 2021 |
| INVENTOR(S) | : Aslin et al. |

It is certified that error appears in the above-identified patent and that said Letters Patent is hereby corrected as shown below:

In the Claims

Column 16, Line 27, should read:
8. An electrowinning cathode assembly comprising a hanger bar as claimed in claim 1, and a cathode portion connected to the hanger bar by an aluminum bronze joint.

Column 16, Line 32, should read:
9. The electrowinning cathode assembly according to claim 8, wherein the joint comprises a fillet weld.

Column 16, Line 35, should read:
10. The electrowinning cathode assembly according to claim 9, wherein the fillet weld is formed using an aluminum bronze welding rod or wire.

Column 16, Line 37, should read:
11. The electro winning cathode assembly according to claim 8, wherein the cathode portion comprises a cathode plate.

Column 16, Line 40, should read:
12. The electrowinning cathode assembly according to claim 8 wherein the welded seal is achieved using a welding rod or a welding wire comprising 75 to 94 wt % copper, 8.5 to 11 wt % aluminum and 0.5 to 1.5 wt % iron, with a total of iron plus other elements being no more than 5 wt %.

Signed and Sealed this
Seventh Day of June, 2022

Katherine Kelly Vidal
*Director of the United States Patent and Trademark Office*